April 8, 1969        R. A. ALLEN        3,437,248
MULTIPURPOSE AUTOMOBILE CARRIER
Filed Sept. 5, 1967
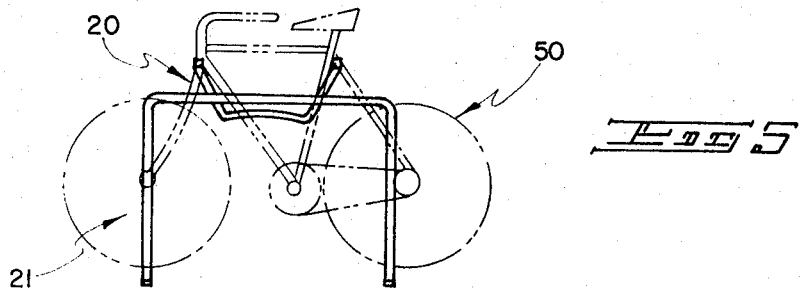
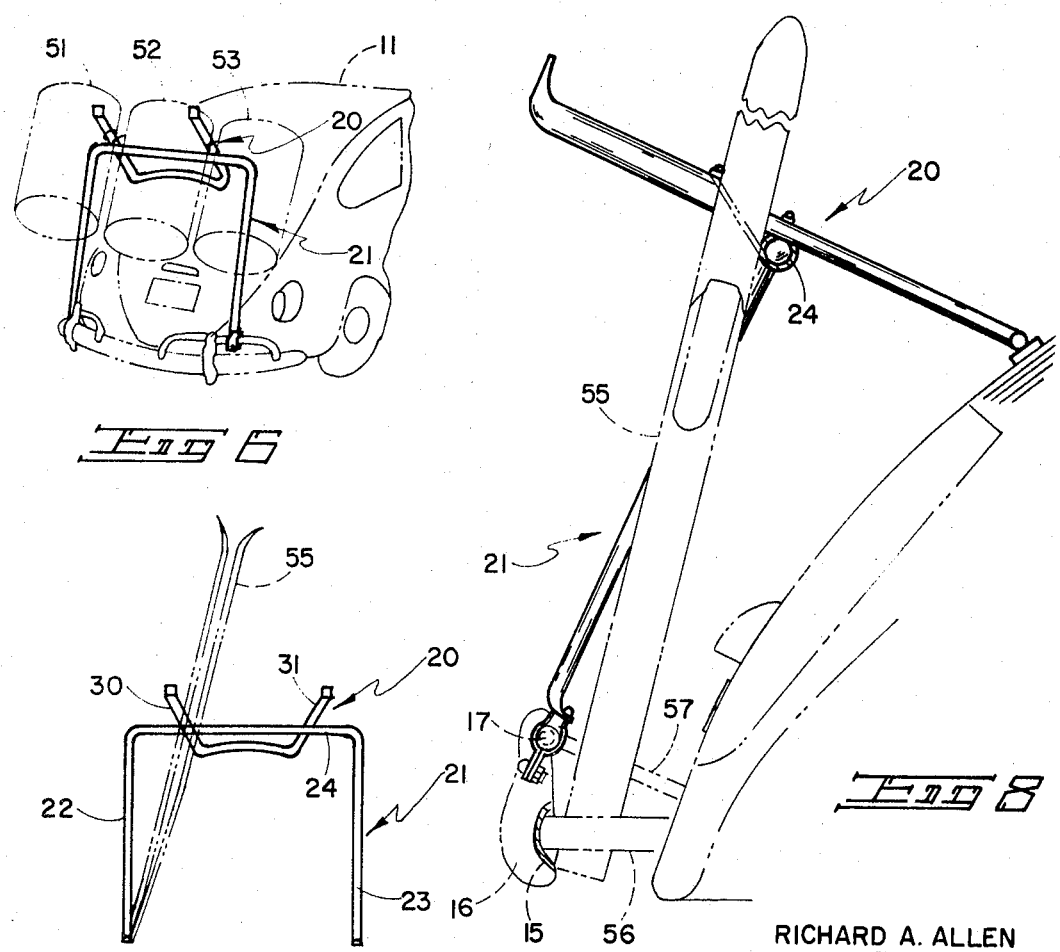
RICHARD A. ALLEN
INVENTOR.
BY *Melvin E. Frederick*
ATTORNEY

United States Patent Office 3,437,248
Patented Apr. 8, 1969

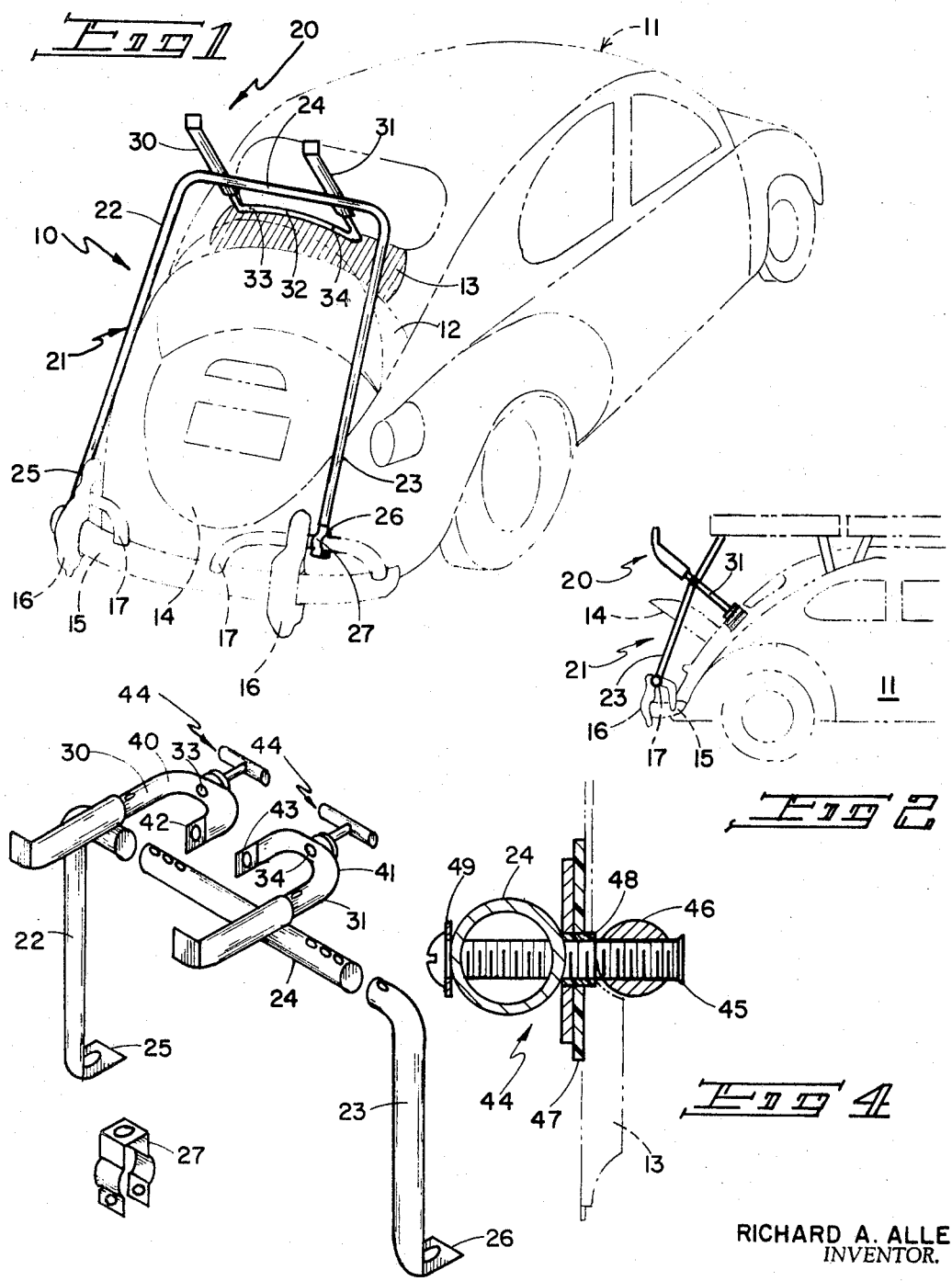

3,437,248
MULTIPURPOSE AUTOMOBILE CARRIER
Richard A. Allen, Bowles Terrace, Lincoln, Mass. 01773
Filed Sept. 5, 1967, Ser. No. 665,619
Int. Cl. B60r 9/06, 19/02
U.S. Cl. 224—42.03        7 Claims

ABSTRACT OF THE DISCLOSURE

A carrier for carrying objects on an automobile, intended for attachment to the rear portion of the automobile, the carrier comprising a generally M-shaped carrier member adapted for attachment to the body of the automobile and a generally U-shaped support member for supporting the M-shaped member and adapted for attachment to both the M-shaped member and the automobile.

---

This invention relates to carriers for carrying articles such as bicycles, trash barrels, skis and other awkward articles on the rear of an automobile.

Quite often the need arises for carrying bicycles, trash barrels, skis or similar awkward articles on an automobile. The requirement is more usually found on compact automobiles especially of foreign manufacture, due to limited interior and luggage space. Some attempts have been previously made to provide carriers or racks for carrying large and bulky articles as well as racks specifically intended for carrying only bicycles. A carrier in accordance with the present invention is not limited to carrying only one or specific types of awkward articles but can carry bicycles simply, conveniently and safely, a plurality of trash barrels, skis, and the like with equal facility. It can also serve as a frame on which luggage can be hung or tied. Further, while still serving its primary function, it can simultaneously serve as a base structure for supporting one end of a second roof rack or roof rack extension.

Usually when any of the previous carriers or racks are mounted other than on the roof, they restrict if not completely exclude access to the engine or trunk compartment. Also, some previous bicycle racks for automobiles attach only to the bumper. Unfortunately, on certain automobiles, the bumpers have insufficient rigidity for properly carrying bicycles, especially at high speeds. Further, on such racks (as well as others) a bicycle is held in such a position that the view of the tail lights and number plate is blocked, the former being unsafe and the latter illegal. It is an object of the present invention to overcome the above-noted limitations.

Other objects, advantages, and features of the invention will be more clearly understood from the following detailed description and the accompanying drawings in which:

FIGURE 1 is a perspective view of the invention showing its relation to a small automobile, the automobile being shown in phantom;

FIGURE 2 is a side view of the invention further showing its relation to an automobile and also showing how it may be used as a base structure for a roof rack;

FIGURE 3 is an exploded perspective view of a collapsible embodiment of the invention;

FIGURE 4 is a cross sectional view showing details of the attachment means associated with the grill of the automobile;

FIGURE 5 is a planar view illustrating how a bicycle may be carried;

FIGURE 6 is a perspective view illustrating how trash barrels and the like may be carried; and FIGURES 7 and 8 are respectively a planar view and a cross sectional view illustrating how skis may be carried.

The carrier generally indicated by the number 10 is mounted on a small or compact automobile 11 (shown in phantom) having a sloping rear deck 12 and a grill 13 of conventional design and configuration to provide ventilation in known manner to an engine. The engine (not shown) is disposed under a hinged portion 14 of the rear deck, which hinged portion is movable to an open and closed position (both of which are shown in FIGURE 1) to provide access to the engine in known manner. The hinged portion 14 is generally triangularly shaped as shown, having a maximum width at its upper portion less than the width of the rear of the automobile. Conventional bumper means 15 extend across the rear of the automobile 11 and bumper guards 16 support a guard rod 17 extending above and generally parallel to the bumper means 15. An automobile 11 having the above noted characteristics is well suited to the use of a carrier in accordance with the invention. However, it is to be understood that the invention may be used on automobiles with other characteristics.

Directing attention now to the carrier 10 shown in FIGURE 1, it will be seen that the invention comprises principally a generally M-shaped article carrying member 20 and a generally inverted U-shaped support member 21. The U-shaped member 21 is comprised of legs 22 and 23 connected by a cross member 24. The distal ends 25 and 26 of legs 21 and 23 are attached to the lower rear portion of the automobile such as, for example, the bumper rods 17 by conventional attachment means 27. Members 20 and 21 are preferably formed of suitable metal tubing and bent to the required shape.

The generally M-shaped member 20 to which articles to be carried are attached is comprised of legs 30 and 31 connected to an arcuate middle member 32, legs 30 and 31 and member 32 having a generally M-shape as shown. The middle member 32 is arcuate or bent to provide two spaced points 33 and 34 of attachment, the legs 30 and 31 being attached intermediate their ends at substantially right angles to the longitudinal axis of the cross member 24.

FIGURE 2 is a side view of the carrier and serves to show that the M-shaped support member 20 is most advantageously disposed at an inclined angle to the horizontal as by proper selection of the lengths of legs 22 and 23. In this figure is also shown how the present rack can be easily and conveniently used as a base structure by which the back end of a second roof rack might be supported.

FIGURE 3 is of particular importance as it illustrates a collapsible embodiment of the invention which not only greatly facilitates packaging and shipping to the point of sale, but also storage thereof by the purchaser, which are not inconsequential features. As best shown in FIGURE 3, the M-shaped member is preferably divided into two parts 40 and 41, each comprising respectively one leg 30 and 31 and one half of the middle portion 32 (see FIGURE 1). The U-shaped portion on the other hand is preferably divided into three separate parts as shown, i.e., leg 22, leg 23 and cross member 24. While the legs 22 and 23 and cross member 24 are best interconnected by conventional connectors, bolts or the like, special attention should be given the connection of parts 40 and 41. These two parts are best joined by providing flattened ends 42 and 43 and bolting them together. Flattened ends 42 and 43 should be flattened in a plane which is perpendicular to the longitudinal axis of the cross member 24. This is necessary if maximum strength is to be provided because a bending moment is produced when loads are attached to legs 30 and 31.

While the M-shaped member may be made of three pieces, more or less in the manner shown for the U-shaped member, this tends to result in a rather unstable carrier and accordingly, such is not recommended. The distal ends 25 and 26 of respectively legs 22 and 23 are flattened and adapted to be bolted to respectively conventional attachment means such as clamps 27. Upon attachment of a clamp 27 to each of ends 25 and 26, the clamps are attached to bars 17 in conventional manner.

The M-shaped member after assembly is attached at points 33 and 34 to the grill 13 by attachment means 44 details of which are shown in FIGURE 4. Thus, as shown in FIGURE 4, attachment means 44 comprise a bolt 45 passing through the M-shaped member and extending substantially therepast. An elongated rod shaped nut 46 is drilled and threaded intermediate its ends to receive bolt 45. Nut 46 is dimensional to fit through grill 13. A rubber washer 47 and a plastic sleeve 48 serve to prevent damage to the automobile finish. A lock washer 49 is also provided under the head of the bolt 45.

Attachment means 44 are uniquely suited for a blind installation as the rod-shaped nut will easily fit through the grill and when turned 90°, securely attach the M-shaped member to the grill. The rod-shaped nut 46 also is peculiarly adapted to comply with the inside grill construction. The threads on the distal end of bolt 45 are deformed after the attachment means have been mounted on the M-shaped member to prevent inadvertent loss of nut 46 inside the grill.

To facilitate the carrying of articles, legs 30 and 31 are preferably covered with a suitable compliant padding material such as plastic or rubber tubing. The legs 30 and 31 are preferably made long enough to extend past U-shaped member 21 to receive and carry three bicycles, but still not extend past the bumper. The distal ends of legs 30 and 31 may be flattened and bent upwardly. The manner in which a bicycle 50 may be mounted is illustrated in FIGURE 5, the bicycle (shown in phantom) being carried by member 20, member 21 serving to hold it away from the automobile. The previously mentioned inclined angle of member 20 and the bent up ends thereof prevent the bicycle or bicycles from falling off.

Up to three trash barrels 51, 52 and 53 (shown in phantom) may be carried as shown in FIGURE 6. The handles of the barrels are slipped over the legs of member 20 and again, the inclined angle and ends of member 20 prevent the barrels from falling off, member 21 also holding them away from the automobile.

Skis 55 and the like may be carried as shown in FIGURES 7 and 8. As shown in these figures, the skis (shown in phantom) may be positioned such that their flat sides are parallel to the direction of motion of the car thereby to keep wind resistance at a minimum. The upper portion of the skis may be tied to cross member 24 and/or member 20.

On some types of automobiles there are two supports attached to the bumper means, a main bumper support 56 and bumper bar support 57 (shown in phantom). Where these supports 56 and 57 are offset as illustrated in FIGURE 8, the tails of the skis may be slipped between them. Proper choice of the location of legs 30 and 31 will result in the skis being wedged between supports 56 and 57 and if desired the appropriate leg of the M-shaped member.

Common articles of luggage may be carried in the manner of carrying barrels. In the case of duffle bags, ski poles and the like, these may simply and conveniently be tied onto the top of the carrier parallel to cross member 24.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A carrier for an automobile having a rear deck, a portion of which is hinged for movement to an open and a closed position, bumper means disposed below said hinged portion and a grill in said rear deck disposed above said hinged portion, comprising:
 (a) a support member having a substantially U-shape, said support member comprising first and second leg portions connected to a cross portion to define said substantially U-shape;
 (b) first attachment means adapted to fix the distal ends of said first and second legs portions to said bumper means;
 (c) a carrier member having a substantially M-shape, said carrier member comprising third and fourth legs portions connected to an arcuate middle portion to define said substantially M-shape;
 (d) second attachment means adapted to fix intermediate their ends said third and fourth legs at substantially right angles to said cross member; and
 (e) third attachment means adapted to fix said arcuate middle portion intermediate said third and fourth legs to said grill.

2. The combination as defined in claim 1 wherein said cross member has a length not substantially less than the width of said hinged portion whereby when said carrier is operatively attached to said automobile, said hinged portion may be moved to its open and closed position.

3. The combination as defined in claim 2 wherein said third attachment means fixes said arcuate middle portion to said grill at two spaced points.

4. The combination as defined in claim 3 wherein said first and second leg portions are separate from said cross portion, said combination additionally including fourth attachment means for connecting said first and second leg portions to said cross portion.

5. The combination as defined in claim 4 wherein said carrier member is comprised of at least two parts and each part includes one of said carrier member leg portions, said combination additionally including fifth attachment means for connecting said at least two parts.

6. The combination as defined in claim 1 wherein said third attachment means comprises an elongated threaded bolt and an elongated cylindrical member having a threaded passage intermediate its end and transverse to its longitudinal axis to receive said bolt.

7. The combination as defined in claim 1 wherein said carrier member is comprised of two substantially J-shaped members, each said J-shaped member comprising one leg integral with one half of said arcuate middle portion, said combination additionally including sixth attachment means for fixedly connecting to each other the distal ends of the said one half of said arcuate middle portion.

References Cited

UNITED STATES PATENTS 2,432,732 12/1947 Del-Cano _____ 224—42.03
2,512,267 6/1950 Donnelley _____ 224—42.03

GERALD M. FORLENZA, *Primary Examiner.*

U.S. Cl. X.R.

224—42.1